Oct. 14, 1941.     D. L. McNEAL     2,258,784
BRAKE MECHANISM
Filed Sept. 28, 1940
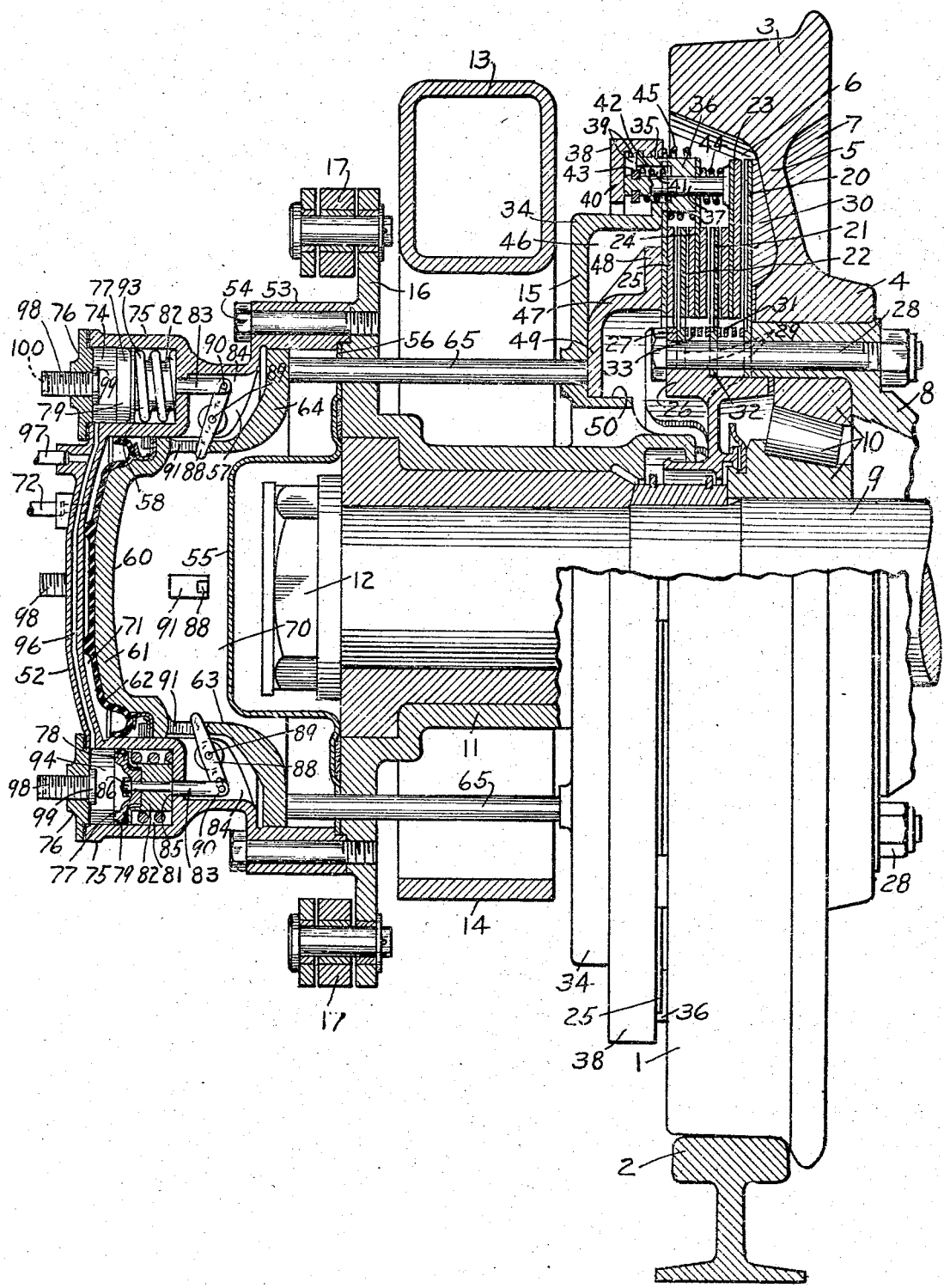
INVENTOR
DONALD L. McNEAL
BY
ATTORNEY Patented Oct. 14, 1941

2,258,784

UNITED STATES PATENT OFFICE 2,258,784

BRAKE MECHANISM

Donald L. McNeal, Wilkinsburg, Pa., assignor to The Westinghouse Air Brake Company, Wilmerding, Pa., a corporation of Pennsylvania Application September 28, 1940, Serial No. 358,749

16 Claims. (Cl. 188—153)

This invention relates to brake mechanism and more particularly to the disk type for use on railway vehicles.

One object of the invention is the provision of an improved brake mechanism embodying means operative by fluid pressure for applying the brakes on a vehicle, and spring means which are normally energized by fluid pressure and which are operative upon the release of fluid pressure to also apply the brakes on the vehicle. The spring means may be arranged to either augment the degree of brake application obtained by the fluid pressure operated means, or for operation in an emergency, such as in case of the loss of fluid pressure on the vehicle, to apply the brakes in order to insure the safe stopping of the vehicle, or for holding the vehicle stopped when there is no fluid pressure on the vehicle.

Another object of the invention is the provision of an improved disk brake mechanism adapted to be operated to apply the brakes on a vehicle either by the action of fluid under pressure or by the action of spring means, or by the conjoint action of both said fluid under pressure and spring means.

Still another object of the invention is the provision of improved means for releasing an application of brakes on a vehicle effected by operation of spring means, without the employment of fluid under pressure, in order to permit shifting of the vehicle around yards or for hauling same in for repair or the like as in case of failure of the fluid pressure supply.

Other objects and advantages will be apparent from the following more detailed description of the invention.

In the accompanying drawing the single figure is a vertical view, partly in section and partly in outline, taken transversely through a side frame and a wheel and axle assembly of a vehicle truck at one end thereof and showing mainly in section the improved brake mechanism applied thereto.

Description

The vehicle truck structure and the parts of the brake mechanism, with which the invention is associated for illustrating an application thereof, and which embodies braking elements and fluid pressure actuated means for controlling same, may be the same as disclosed in the copending application of Ellis E. Hewitt, Serial No. 253,316, filed January 28, 1939. Only those parts of the structure disclosed in the Hewitt application are therefore shown in the drawing and will be hereinafter described which are considered essential to a clear understanding of the invention.

In the drawing the reference numeral 1 indicates a wheel of the usual flanged type used in connection with railway vehicles for rolling on a rail 2. The wheel comprises the usual tread 3, a central hub 4, and a web 5 connecting the tread and hub. In the outer face of wheel 1 there is provided an annular cavity 6 while in the inner face of the wheel there is an annular cavity 7. The hub 4 is rigidly secured to one end of an axle tube 8 which secures the two wheels of a wheel and axle assembly in the desired spaced relation. An axle 9 extends through the tube 8 and is supported at either end of the wheel and axle assembly by a roller bearing 10 which is interposed between the axle and the end of the axle tube within the wheel hub 4.

The axle 9 projects beyond the outside face of the wheel 1 and journaled on this extended portion of the axle is a journal box 11 which is held in place by means including a nut 12 secured to the end of the axle. The reference numeral 13 indicates a side member of a truck frame, it being noted that said side member is disposed outward of the wheel 1 and is provided with the usual depending pedestal legs 14, only one of which is shown, said legs being spaced apart and arranged to slide in slots (not shown) provided in the opposite sides of the journal box 11.

The journal box 11 is provided adjacent its inner end, that is, between the wheel 1 and truck frame side member 13, with an annular flange 15 radiating therefrom for carrying the non-rotatable parts of the brake mechanism which will be later described. At the opposite end of the journal box is a similar flange 16 which as shown in the drawing, is disposed outward of the truck frame side member 13. Both above and below the axle 9 the journal box flange 16 is connected to members 17 which are adapted to be secured to any desired part of the truck frame for holding the journal box 11 and thereby the non-rotatable parts of the brake mechanism, which are secured thereto, against turning when an application of brakes on the truck is effected as will be later described. By thus holding the journal box 11 against turning or twisting between the pedestal legs 14 undue wear of the engaging parts will be avoided and the truck frame will be maintained in condition for free vertical movement on its supporting springs (not shown), in the usual manner.

The brake mechanism comprises three annular rotatable friction brake elements or disks 20, 21 and 22 and a like number of non-rotatable brake elements or disks 23, 24 and 25 interleaved with said rotatable brake elements with the rotatable brake element 20 disposed at one end of the pile and adjacent the wheel 1. These brake elements are all arranged in coaxial relation with each other and with the truck wheel 1 and are substantially contained within the cavity 6 provided in the outer face of the wheel and therefore encircle the axle 9 as will be apparent.

The several brake elements also encircle an annular sleeve 26 one end of which fits within the open end of the axle tube 8. The sleeve has at its opposite or outer end an annular flange 27 and extending through this flange and the end portion of axle tube 8 are a plurality of torque bolts 28 which are equally spaced from each other around the sleeve and which rigidly secure said sleeve to the wheel and axle assembly for rotation therewith.

The inner diameter of the rotatable brake elements 20, 21 and 22 is at least no greater than the diameter of the circle including the centers of the torque bolts 28 and each of said elements is provided in its inner edge with slots 29 which are so spaced as to receive said bolts, the side walls of these slots providing a driving and supporting connection between said brake elements and bolts whereby the rotatable brake elements will at all times turn with the wheel 1.

A filler piece 30 is interposed between the wheel flange 5 and rotatable brake element 20 for supporting said element against axial movement and distortion in the direction of wheel web 5.

A release spring 31 encircling the bolts 28 between the rotatable brake elements 20 and 21 acts on said elements for at all times maintaining the element 20 in the position shown and for urging the element 21 to a brake release position defined by engagement with a shoulder 32 provided in the sleeve 26. A like release spring 33 also encircling the bolts 28 between the rotatable brake elements 21 and 22 acts thereon for urging the element 22 to its brake release position which is defined by contact with the flange 27 provided on the outer end of sleeve 26. It will be noted that the inside diameter of the non-rotatable brake elements 23, 24 and 25 is greater than the outside diameter of the springs 31 and 33 and of flange 27 at the end of the sleeve 26, respectively.

The journal box flange 15 supports at its outer edge a cylindrical portion 34 which extends in the direction of the wheel 1 and which is provided around the end closest to the wheel with an annular flange 35 projecting radially therefrom and so arranged so to be engaged by the non-rotatable brake element 25 for defining its release position in which it will be out of contact with the rotatable brake element 22 when in its release position above described.

The flange 35 has a plurality of bosses 36 projecting in the direction of the wheel 1. Slots are provided in the outer edge of the non-rotatable brake element 25 to fit over these bosses for supporting said element and for securing same against rotational movement relative to the journal box. A bolt 37 is mounted to slide in a suitable bore extending through each of the bosses 36 parallel to the axis of the brake elements. The non-rotatable brake element 24 is provided with apertures through which the several bolts 37 extend for supporting said brake element, and said brake element is adapted to engage the ends of the bosses 36 for defining its release position substantially midway between the rotatable brake elements 21 and 22, when in their brake release positions above described. The non-rotatable brake element 23 is secured to the ends of the bolts 37 closest to the wheel 1 for support and for holding the element against turning relative to the journal box.

A ring 38 is mounted on the outer peripheral surface of the flange 35 carrying the bosses 36 and is secured against axial movement relative to said flange by the interengagement of teeth 39 projecting from said ring and surface. The ring 38 has at the end adjacent the truck side frame 13 an inwardly extending annular flange 40 arranged to be engaged by the adjacent ends of the bolts 37, which carry the non-rotatable brake element 23, for defining the release position of said element midway between the rotatable brake elements 20 and 21 when in their release positions above described.

Extending from the outer face of the journal box flange 35 into each of the bosses 36 is a cavity 41, and the bolt 37 carried by each boss extends through the cavity 41 therein. A release spring 42 is provided in each cavity 41 around the bolt 37 therein and bears at one end against the bottom of the cavity and at the opposite end against a seat ring 43 secured to the bolt. The springs 42 are under compression and are provided for urging the bolts 37 into engagement with the flange 40 of ring 38 for thereby moving the non-rotatable brake element 23 to its release position above mentioned. Encircling each bolt 37 and bearing at one end against the non-rotatable brake element 23 and at the opposite end against the non-rotatable brake element 24 is a release spring 44 which is under compression, the several springs 44 being provided for urging the non-rotatable brake element 24 into contact with the ends of bosses 36 and thus to its release position. Around each boss 36 there is provided a coil spring 45 bearing at one end against the non-rotatable brake element 24 and at the opposite end against the non-rotatable brake element 25, these springs being also under compression and provided for moving the non-rotatable brake element 25 into contact with the journal box flange 35 which defines its release position.

The cylindrical portion 34 of the journal box flange 35 encircles an annular cavity 46 in which there is provided an annular operating member or strut 47 for the braking elements or disks. This member comprises a central cylindrical portion having at the end adjacent the wheel an outwardly extending annular ring-like portion 48 for engagement with the outer face of the non-rotatable brake element 25 and at the opposite end an inwardly extending annular flange 49 which is adapted to substantially engage the journal box flange 15 when the brake elements are in their release positions above described. The flange 49 on the operating member 47 encircles and slides on a bearing 50 projecting from the journal box flange 15 in the direction of the wheel, said member being adapted to be moved on this bearing to its release position shown by the non-rotatable brake element 25 when moved to its release position by the release springs 45.

Beyond the outer end of the journal box 11 there is disposed an annular brake cylinder device 52 which is cup shaped and which has at its larger open end a cylindrical portion 53 bearing against the journal box flange 16 and rigidly secured thereto by bolts 54. A cover 55 over the end of the axle 12 is provided with an annular flange 56 which is clamped between the cylindrical portion 53 of the brake cylinder device and the journal box flange 16 to prevent dirt or other foreign matter from the brake cylinder device entering the bearing between the axle and the journal box.

The cylindrical portion 53 of the brake cylinder device is joined by a frustro-conical portion 57 to a coaxially arranged cylindrical portion 58 of smaller diameter. A brake cylinder piston 60 comprising a pressure head 61 and packing cup 62 of usual construction are slidably mounted in the cylindrical portion 58. The pressure head 61 has a skirt portion 63 which for a portion of its length in the direction of the journal box is substantially cylindrical in shape and adapted to slide over the axle cover 55, this portion joining the pressure head at one end to a guide portion 64 at the opposite end which is slidably mounted in the bore of the cylindrical portion 53 of the brake cylinder casing. The piston guide portion 64 at one end of the journal box is operatively connected to the operating member 47 at the opposite end by means of a plurality of struts or pins 65 which are equally spaced from each other around the axle and which are slidably mounted and supported in suitably aligned bores provided through the journal box flanges 16 and 15.

Between the brake cylinder piston 60 and the cover 55 over the end of axle 9 is a non-pressure chamber 70 which is opened to the atmosphere in any desired manner such as by way of clearance space which may exist around the pusher pins 65 through the journal box flange 16. At the opposite face of the brake cylinder piston 60 is a pressure chamber 71 which is open to a pipe 72, through which fluid under pressure is adapted to be supplied to and released from said chamber for controlling the operation of the brake cylinder piston to effect an application and release, respectively, of the brakes on the wheel 1. This pipe may be connected to the usual straight air pipe of a brake equipment through the medium of which the braking of wheel 1 may be controlled on the usual straight air principle.

As so far described the brake mechanism and its operation, which will be later set forth, may be the same as that of the brake mechanism disclosed in the copending application of Ellis E. Hewitt heretofore referred to.

According to the invention a plurality of spring cylinders 75 are equally spaced around the exterior of the brake cylinder casing portions 57 and 58 and are preferably formed integral therewith. Each of these spring cylinders has a bore which is open at the outer end of the brake cylinder device and the open end of each bore is closed by a cover 76 which is secured to the cylinder in any desired manner.

In the bore in each cylinder device 75 there is slidably mounted a movable abutment 77, which comprises a packing cup 79 slidably engaging the wall of the bore and clamped between a follower member 82 at one side of the cup and a ring 78 at the opposite side of the cup. For clamping these parts together in each spring cylinder 75 a piston rod 83, which extends through a suitable bore in the closed end of the spring device into a cavity 84 which is open to the space surrounding the cylindrical skirt portion 63 of the brake cylinder piston 60, has a shoulder 85 which engages the end of the follower 82. Beyond this shoulder each of the piston rods 83 is provided with a portion of reduced diameter which extends through the follower member 82 and ring 78 and which is provided on its end with a nut 86 screwed up against the ring 78.

In each cavity 84 is a lever 88 which is fulcrumed intermediate its ends on a pin 89 secured in the brake cylinder casing. One end of each of the levers 88 is connected by a pin 90 to the end of the piston rod 83 projecting into the cavity 84. The other end of each lever 88 extends into a slot 91 provided through the skirt portion 63 of the brake cylinder piston 60, this slot being so arranged that the edge closest to the journal box is in substantial contact with the lever when the brake cylinder piston 60 and the lever 88 are both in their brake release positions as shown in the drawing. The slots 91 are provided to allow full travel of the brake cylinder piston 60 relative to the levers 88 to effect operation of the brake mechanism to brake the wheel 1, as will be later brought out.

In each of the spring cylinders 75 a coil spring 93 encircles the follower 82 and bears at one end against the closed end of the piston bore and at the opposite end against the follower 82, the several springs 93 being under compression and therefore operative to urge the movable abutments 77 in the direction of the covers 76 for operating the brake mechanism to apply the brakes on the truck as will be later described.

At the opposite face of each of the movable abutments 77 is a pressure chamber 94, the several chambers 94 being connected with each other through communicating passages 96 which are connected to a pipe 97 through which fluid under pressure may be supplied to and released from said chambers. The supply of fluid under pressure to and its release from the chambers 94 by way of pipe 97 may be controlled in any desired manner, as for instance, the pipe 97 may be connected to the usual emergency pipe of a brake equipment which is normally charged with fluid under pressure and which in case of emergency is adapted to be vented for effecting an application of brakes. When the cylinders 94 are thus charged with fluid under pressure from the control pipe 97 such pressure acting on the movable abuts 77 is adapted to move same to their normal release position shown and defined by engagement by the followers 82 with the closed ends of the bores in said devices. Movement of the abutments 77 to this position is adapted to compress the springs 93. Upon the venting of fluid under pressure from chambers 94 the force of springs 93 is adapted to urge the movable abutments 77 in an outwardly direction for thereby operating the piston rods 83 to turn the connected levers 88 in such a direction that the ends connected with the brake cylinder piston 60 will effect movement thereof in the direction of the journal box 11.

The cover 76 over each of the spring cylinders 75 carries a member 98 for moving the movable abutment 77 therein to its brake release position shown when the pressure chamber 94 is void of fluid pressure. This member 98 may, as shown in the drawing, be in the form of a screw having screw threaded engagement with the cover and being provided on the end within chamber 94 with a head 99 for engagement with the movable abutment 77. In the opposite end of each screw 98 which is disposed outside of the cylinder, is a socket 100 for receiving the end of a socket wrench through the medium of which the screw is adapted to be turned in the cover 76.

*Operation*

Let it be assumed that pressure chambers 94 in the spring cylinders 75 are charged with fluid under pressure supplied through the pipe 97, which as before mentioned may be supplied with fluid under pressure from a normally charged emergency pipe of any conventional type of brake equipment. With the chambers 94 thus charged, the movable abutments 77 are urged to their release positions shown thereby energizing or compressing the brake applying springs 93 and positioning the piston rods 83 and levers 88 in their brake release positions shown in the drawing.

Let it be further assumed that pressure chamber 71 in the brake cylinder device 52 is void of fluid under pressure, being vented through the pipe 72 which as before stated may be connected with the usual normally vented straight air pipe of a fluid pressure brake system. With the piston chamber 71 thus vented the brake elements or disks of the brake mechanisms, and thus the operating member 47, will be urged to their release positions shown as hereinbefore described, and the pressure urging the member 47 to its release position is adapted to act through the strut pins 65 on the brake cylinder piston 60 for urging it to its release position also shown. With the brake apparatus conditioned as just described the brake elements or disks will be disengaged from each other so as to permit the rotatable brake elements 20, 21 and 22 to freely rotate with the wheel 1 as the vehicle is moved along the rail 2.

If now it is desired to brake the wheel 1 to decelerate or stop rotation of same, fluid under pressure may either be supplied through the pipe 72 to the brake cylinder piston chamber 71 or be vented from the pressure chamber 94 in the spring devices 75 or, if desired, fluid under pressure may be vented from the pressure chambers 94 at the same time as fluid under pressure is supplied to the piston chamber 71.

Let it be assumed however that the pressure chamber 94 in the spring devices 75 are maintained charged with fluid under pressure and that fluid under pressure is supplied to the brake cylinder pressure chamber 71. The pressure of fluid thus supplied to act on the brake cylinder piston 60 is adapted to move same relative to the levers 88 in the direction of the journal box, to thereby effect movement of the strut pins 65 and operating member 47 in the direction of the truck wheel 1. As the operating member 47 is thus operated, it will effect axial movement of the non-rotatable brake element 25 into contact with the rotatable brake element 23 which will then be moved axially into engagement with the non-rotatable brake element 24. The non-rotatable brake element 24 will in turn be moved axially into contact with the rotatable brake element 21 which in turn will be moved into engagement with the non-rotatable brake element 23. The non-rotatable brake element 23 will then be forced into contact with the rotatable brake element 20 which is backed up against axial movement by the spacer 30 engaging the wheel web 5. After the several brake elements are thus moved into frictional interengagement the pressure of fluid acting on the brake cylinder piston 60 will force same against each other and since the non-rotatable brake elements are held against rotation by the journal box the rotatable brake elements and thereby the truck wheel 1 will be braked. The degree with which the truck wheel 1 will be braked is dependent upon the pressure of fluid supplied to the pressure chamber 71 for acting on the brake cylinder piston 60 and this may be varied in the usual manner by varying the pressure of fluid supplied to the pipe 72.

In order to effect a release of brakes after an application effected as just described, the fluid under pressure is vented from the brake cylinder pressure chamber 71 through the pipe 72, following which the release springs acting on the brake elements or disks will effect movement thereof back to their release positions as above described, so that the rotatable brake elements or disks and thereby the wheel 1 will again be free to rotate.

Let it be assumed the brake cylinder pressure chamber 71 is at atmospheric pressure and that fluid under pressure is vented from pressure chamber 94 in the spring devices 75 by way of pipe 97 and the emergency pipe to which pipe 97 may be connected. Upon the venting of fluid under pressure from the pressure chambers 94 the pressure of springs 93 moves the movable abutments 77 in the direction away from the journal box and thereby act through the piston rods 83 to rock the levers 88 so that their inner ends move in the direction of the journal box. With the brakes on the wheel released, the inner ends of the levers 88 are in contact with the ends of slots 91 in the brake cylinder piston 60 which are adjacent the journal box, so that upon operation of said levers by the springs 93 the pressure of said springs becomes effective to move the brake cylinder piston 60 in the direction of the journal box for thereby operating the strut pins 65 to urge the annular brake elements or disks into frictional interengagement to effect braking of the wheel 1. The degree with which the wheel 1 is braked by operation of the springs 93 may be of any desired value dependent upon the force characteristics of the springs and of the moment arms of levers 88, as will be apparent.

In order to release an application of brakes on wheel 1 effected by operation of the springs 93, fluid under pressure will be supplied to the pipe 97 and thereby to the pressure chambers 94 in the several spring devices for moving the abutments 77 back to their release positions shown. As the abutments 77 are thus operated they compress or energize the springs 93 for effecting a subsequent application of brakes, and also rock the levers 88 to permit the brake cylinder piston 60 and thereby other parts of the brake mechanism to be returned to their release positions, so that the rotatable brake elements or disks and thereby the wheel 1 will again be free to rotate.

If it is desired to brake the wheel 1 to a degree greater than obtainable by the separate action of either fluid pressure in the brake cylinder piston chamber 71 or by the springs 93, the pressure of fluid may be vented from the pressure chambers 94 in the spring devices at the same time fluid under pressure is supplied to the brake cylinder piston chamber 71, under which condition the brake cylinder piston 60 will be operated by the combined force of said springs and the pressure of fluid in said chamber to operate the brake mechanism to effect braking of the wheel 1 to a proportional degree. In order to release the brakes after an application effected as just described, fluid under pressure will be vented from the brake cylinder piston chamber 71 and the pressure chambers 94 in the spring devices 75 will be recharged with fluid under pressure following which the different parts of the brake mechanism will be moved to their release positions as before described to again free the rotatable brake elements and wheel 1 for rotation.

Assuming that the pipe 72 is connected to a straight air pipe which is normally vented and to which fluid under pressure is adapted to be supplied for effecting a straight air application of brakes, and that the pipe 97 is connected to an emergency pipe which is normally charged with fluid under pressure and from which fluid under pressure is adapted to be vented in case of emergency, it will be apparent that the brakes on the wheel 1 may be controlled by straight air operation of the brake cylinder piston 61 in the usual manner, or by the springs 93 upon emergency venting of the emergency pipe, or by the combined action of fluid pressure in pressure chamber 71 and of the springs 93 if fluid under pressure is vented from the emergency pipe at the same time as fluid under pressure is supplied to the straight air pipe.

In the event that the supply of fluid under pressure on a vehicle is lost due to a failure of any part of the brake apparatus, such as a ruptured hose or pipe, it will be apparent that springs 93 will become effective automatically to apply the brakes on the vehicle and to bring the vehicle to a stop. This as will be apparent, is a very desirable feature. It will also be noted that the action of springs 93 may be employed for holding the brakes on a vehicle applied to hold a car stopped without having to maintain a supply of compressed air on the vehicle.

In case for any reason the brakes on the vehicle are applied by springs 93 and it is desirable to be able to release the brakes on the vehicle without the use of air, so that the vehicle may be hauled in off of the tracks in case of a possible failure of the fluid pressure supply on the vehicle, or may be shifted where desired around a yard without having to charge the brake system on the vehicle, the members 98 in the covers 76 on the spring cylinders 75 are provided for accomplishing this end. These members normally occupy the positions shown to provide for operation of the movable abutment 77 as above described, but if it is desired to effect a release of brakes effected by operation of the springs 93, then by the use of a socket wrench applied to the sockets 100 in the ends of the members 98 said members may be turned into the pressure chambers 94 into contact with the movable abutments 77 following which said abutments are adapted to be moved by further turning of said members to their brake release positions shown. With the abutments 77 thus conditioned, the brakes on the vehicle will be released as will be apparent, so that the vehicle may be freely moved when and where desired. To condition the brake mechanism for again being controlled by fluid pressure it is necessary that the screw members 98 be screwed out again to the positions shown in order to free the movable abutment 77 for control by the pressure of fluid supplied to the chambers 94.

Summary

From the above description it will be apparent that the improved brake mechanism is adapted to be controlled either by fluid pressure operable means or by springs which are so arranged as to act either independently or conjointly. The springs are operative automatically in case of failure of the fluid pressure supply system on the vehicle and also provide a means for maintaining automatically the brakes on a vehicle applied for holding a vehicle parked in a yard or elsewhere without maintaining a supply of fluid under pressure on the vehicle. Novel release means for the springs are provided so that an application of brakes effected by said springs is adapted to be released without the use of fluid under pressure, to thereby permit hauling of a vehicle in for repairs or the like or to provide for movement of a vehicle around a yard when the fluid pressure system on the vehicle is uncharged.

While one illustrative embodiment of the invention has been described in detail it is not the intention to limit it to that embodiment or otherwise than by the scope of the appended claims.

Having now described my invention, what I claim as new and desire to secure by Letters Patent is:

1. A brake mechanism for a wheel of a vehicle truck having an axle carried by said wheel and a journal box journalled on said axle and comprising in the space between said wheel and the adjacent end of said journal box an annular rotatable friction brake element secured to rotate with said wheel, and a non-rotatable brake element arranged to be moved axially relative to said rotatable brake element into frictional engagement therewith to effect braking of said wheel, piston means carried by the opposite end of said journal box and connected to said non-rotatable brake element and operative by fluid under pressure to effect interengagement of said brake elements for braking said wheel, spring means carried by said journal box at said opposite end thereof and connected to said non-rotatable brake element for actuating same, and means operative by fluid under pressure for energizing said spring means and operative upon the release of fluid under pressure for rendering said spring means effective to actuate said non-rotatable brake element.

2. A brake mechanism for a wheel of a vehicle truck having an axle carried by said wheel and a journal box mounted on said axle outward of said wheel, said brake mechanism comprising an annular rotatable friction brake element secured to rotate with said wheel, a non-rotatable brake element carried by the end of said journal box adjacent said wheel and adapted to be moved axially of said rotatable brake element into frictional engagement therewith for braking said wheel, piston means carried by the opposite end of said journal box and operative by fluid under pressure for actuating said non-rotatable brake element, spring means also carried by said opposite end of said journal box and connected to said non-rotatable brake element for actuating same, and means operative by fluid under pressure for normally rendering said spring means ineffective and operative upon the release of fluid under pressure to render said spring means effective to actuate said non-rotatable brake element.

3. A brake mechanism for a wheel of a vehicle truck having an axle carried by said wheel and a journal box carried by said axle outboard of said wheel, said brake mechanism comprising an annular rotatable friction brake element secured to rotate with said wheel, an annular non-rotatable friction brake element carried by the end of said journal box adjacent said wheel and adapted to be moved axially into frictional contact with said rotatable brake element to effect braking of said wheel, a brake cylinder piston carried by the opposite end of said journal box, means connecting said piston to said non-rotatable brake element, said piston being operative by fluid under pressure to operate said means for actuating said non-rotatable brake element into contact with said rotatable brake element, spring means associated with said brake cylinder device and operative through said means to also actuate said non-rotatable brake element, and means operative by fluid under pressure to render said spring means ineffective and upon the release of fluid under pressure effective to actuate said means.

4. A brake mechanism for a wheel of a vehicle truck having an axle carried by said wheel and a journal box carried by said axle outboard of said wheel, said brake mechanism comprising an annular rotatable friction brake element secured to rotate with said wheel, an annular non-rotatable friction brake element carried by the end of said journal box adjacent said wheel and adapted to be moved axially into frictional contact with said rotatable brake element to effect braking of said wheel, a brake cylinder piston associated with the opposite end of said journal box and operative by fluid under pressure to actuate said non-rotatable brake element to brake said wheel, spring means also associated with the said opposite end of said journal box for actuating said non-rotatable brake element, means operable by fluid under pressure for rendering said spring means ineffective and upon the venting of fluid under pressure effective, and common operating means connecting said brake cylinder piston and spring means at one end of said journal box to said non-rotatable brake element at the opposite end of said journal box.

5. A brake mechanism for a vehicle wheel comprising an annular rotatable friction brake element secured to rotate with said wheel, a non-rotatable friction brake element adapted to be moved axially of said rotatable brake element into frictional contact therewith for braking said wheel, a brake cylinder device comprising a casing and a piston therein connected to said non-rotatable brake element and adapted to be operated by fluid under pressure for urging same into contact with said rotatable brake element, spring means carried by said casing and also connected to said non-rotatable brake element for effecting movement of same into frictional contact with said rotatable brake element, and means operative by fluid under pressure for normally rendering said spring means ineffective and upon the release of fluid under pressure effective to move said non-rotatable brake element.

6. A brake mechanism for a wheel comprising an annular rotatable friction brake element secured to rotate with said wheel, an annular non-rotatable friction brake element disposed in coaxial relation with said rotatable brake element and adapted to be moved axially thereof into frictional engagement with said rotatable brake element to effect braking of said wheel, a brake cylinder casing having a piston bore in coaxial relation with said brake elements, a piston slidably mounted in said bore and operatively connected to said non-rotatable brake element and adapted to be operated by fluid under pressure for effecting movement of said non-rotatable brake element into frictional contact with said rotatable brake element, and a plurality of springs associated with said casing and connected to said non-rotatable brake element for also urging same into frictional contact with said rotatable brake element, and means operative by fluid under pressure for normally rendering said springs ineffective and upon the release of fluid under pressure effective.

7. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, a member operative to apply force to said non-rotatable brake element throughout its length for moving same into frictional contact with said rotatable brake element, a brake cylinder piston arranged in coaxial relation with said brake elements and connected to said member and operative by fluid under pressure to actuate said member, spring means also connected to said member and operative to actuate same, and means operative by fluid under pressure for rendering said spring means ineffective and upon the venting of fluid under pressure effective.

8. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, a brake cylinder device having a piston bore arranged in coaxial relation with said brake elements, a piston slidably mounted in said bore and connected to said non-rotatable brake element and operative by fluid under pressure to move said non-rotatable brake element into frictional contact with said rotatable brake element, a plurality of springs carried by said casing and spaced from each other around said bore, means connecting said springs to said non-rotatable brake element for rendering said springs effective to move said non-rotatable brake element into frictional contact with said rotatable brake element, and piston means connected to said springs and operative by fluid under pressure for rendering said springs ineffective, said springs becoming effective upon the release of fluid under pressure on said piston means.

9. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, a brake cylinder device having a piston bore arranged in coaxial relation with said brake elements, a piston slidably mounted in said bore and connected to said non-rotatable brake element and operative by fluid under pressure to move said non-rotatable brake element into frictional contact with said rotatable brake element, a plurality of springs arranged around and carried by said casing, means connecting said springs to said piston for rendering said springs effective to actuate said piston to move said non-rotatable brake element into frictional engagement with said rotatable brake element to brake said wheel, and piston means connected to said springs operative by fluid under pressure for rendering said springs ineffective, said springs being effective upon the release of fluid under pressure on said piston means.

10. A brake mechanism for a vehicle wheel comprising an annular rotatable friction brake element secured to rotate with said wheel, a non-rotatable friction brake element adapted to be moved axially of said rotatable brake element into frictional engagement therewith to effect braking of said wheel, a brake cylinder piston connected to said non-rotatable brake element and operative by fluid under pressure for actuating same, spring means, means connecting said spring means with said piston providing for movement of said piston by fluid under pressure relative to said spring means and operative by said spring means to actuate said piston to also effect movement of said non-rotatable brake element into contact with said rotatable brake element to brake said wheel, and piston means associated with said spring means operative by fluid under pressure to render said spring means ineffective and upon the release of fluid under pressure effective.

11. A brake mechanism for a wheel of a vehicle truck having an axle carried by said wheel and a journal box journalled on said axle and comprising in the space between said wheel and the adjacent end of said journal box an annular rotatable friction brake element secured to rotate with said wheel, and a non-rotatable brake element arranged to be moved axially relative to said rotatable brake element into frictional engagement therewith to effect braking of said wheel, piston means carried by said journal box and connected to said non-rotatable brake element and operative by fluid under pressure to effect interengagement of said brake elements for braking said wheel, spring means carried by said journal box and connected to said non-rotatable brake element for actuating same, and means operative by fluid under pressure for energizing said spring means and operative upon the release of fluid under pressure for rendering said spring means effective to actuate said non-rotatable brake element.

12. A brake mechanism for a wheel of a vehicle truck having an axle carried by said wheel and a journal box carried by said axle outboard of said wheel, said brake mechanism comprising an annular rotatable friction brake element secured to rotate with said wheel, an annular non-rotatable friction brake element carried by the end of said journal box adjacent said wheel and adapted to be moved axially into frictional contact with said rotatable brake element to effect braking of said wheel, a brake cylinder piston associated with said journal box and operative by fluid under pressure to actuate said non-rotatable brake element to brake said wheel, spring means also associated with said journal box for actuating said non-rotatable brake element, means operable by fluid under pressure for rendering said spring means ineffective and upon the venting of fluid under pressure effective, and common operating means connecting said brake cylinder piston and spring means to said non-rotatable brake element.

13. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, a member operative to apply force to said non-rotatable brake element throughout its length for moving same into frictional contact with said rotatable brake element, a brake cylinder device arranged in coaxial relation with said brake elements and connected to said member and operative by fluid under pressure to actuate said member, spring means also connected to said member and operative to actuate same, and means operative by fluid under pressure for rendering said spring means ineffective and upon the venting of fluid under pressure effective.

14. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, an annular brake cylinder device in coaxial relation with said brake elements and comprising a stationary part and a relatively movable part carried by said stationary part and connected to said non-rotatable brake element and operative by fluid under pressure to move said non-rotatable brake element into frictional contact with said rotatable brake element, a plurality of springs spaced from each other around a circle in coaxial relation to said brake cylinder device, means connecting said springs to said non-rotatable brake element for rendering said springs effective to move said non-rotatable brake element into frictional contact with said rotatable brake element, and piston means connected to said springs and operative by fluid under pressure for rendering said springs ineffective, said springs becoming effective upon the release of fluid under pressure on said piston means.

15. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to brake said wheel, an annular brake cylinder device connected to one end of the pile of brake elements and adapted to be operated by fluid under pressure to actuate said non-rotatable brake element, spring means connected to said one end of said pile of brake elements and operative to actuate said non-rotatable brake element, and means associated with said spring means adapted to be operated by fluid under pressure to render said spring means ineffective and upon the release of fluid under pressure effective, the last named means, said spring means and said brake cylinder device all being located beyond one end of said pile of brake elements.

16. A brake mechanism for a vehicle wheel comprising an annular rotatable friction brake element secured to rotate with said wheel, an annular non-rotatable friction brake element disposed in coaxial relation with said rotatable brake element and adapted to be moved axially into frictional engagement with said rotatable brake element to effect braking of said wheel, an annular brake cylinder device arranged in coaxial relation with said brake elements and comprising a stationary part and a relatively movable part carried by said stationary part and connected to said non-rotatable brake element and operative by fluid under pressure to move said non-rotatable brake element into frictional contact with said rotatable brake element, connecting means providing an operating connection between said movable part and non-rotatable brake element, spring means connected to said connecting means for actuating same to move said non-rotatable brake element into frictional contact with said rotatable brake element, and piston means connected to said spring means and operative by fluid under pressure to render said spring means ineffective and upon the release of fluid under pressure effective.

DONALD L. McNEAL.